April 30, 1940.     F. E. WOLCOTT     2,198,647
COOKING UTENSIL
Original Filed July 10, 1935
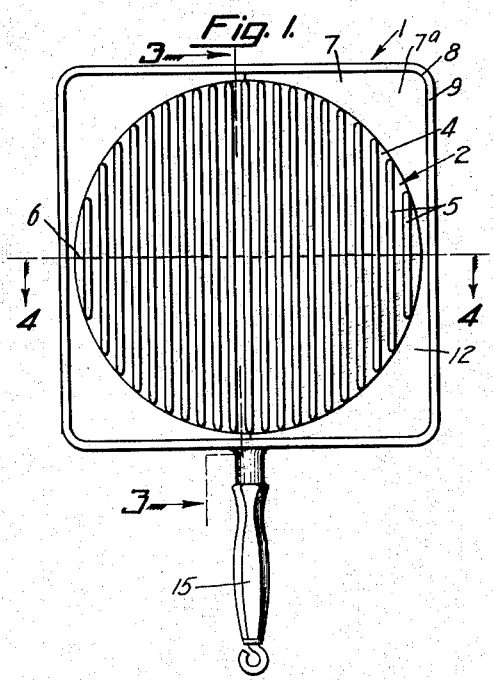
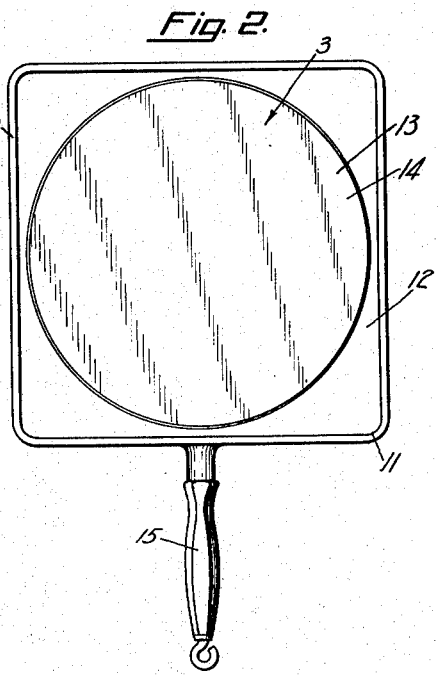
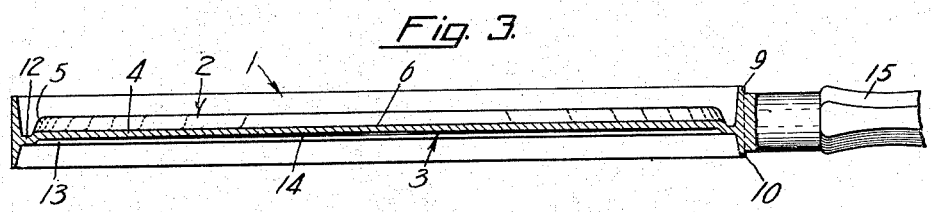
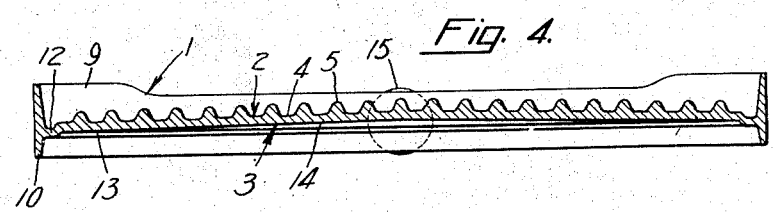
INVENTOR
Frank E. Wolcott
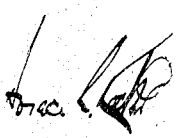
By
ATTORNEY Patented Apr. 30, 1940

2,198,647

UNITED STATES PATENT OFFICE 2,198,647

COOKING UTENSIL

Frank E. Wolcott, West Hartford, Conn., assignor to The Silex Company, a corporation of Connecticut Original application July 10, 1935, Serial No. 30,647. Divided and this application August 24, 1938, Serial No. 226,600

11 Claims. (Cl. 53—5)

My invention relates to cooking utensils.

It has among its objects to provide an improved combined invertible utensil especially adapted to use in connection with an electric cooking device of the circular reflector type described and claimed in my copending application Serial No. 30,647, filed July 10, 1935, of which this application is a division. Further objects of my invention are to provide an improved broiling pan and to provide an improved frying pan, each having improved features of construction and each combined in an improved manner with the other in a single utensil. A still further object of my invention is to provide such an improved construction whereby, while obtaining the above advantages, it is also made possible to support and position the broiling pan in an improved manner and to provide a frying surface within the limits of the supporting and positioning periphery thereof and in the opposite face of the broiler supporting surface, all while lightening the broiler pan structure and without materially increasing the cost. Still another object of my invention is to provide an improved combined broiling and frying pan adapted to be used when in one position as a broiling pan, and, when inverted, as a frying pan, while utilizing common structure in both pans and in either position utilizing different portions of both pans to perform different functions. These and other objects and advantages of my improved construction will, however, hereinafter more fully appear.

In the accompanying drawing, I have shown for purposes of illustration one embodiment which my invention may assume in practice.

In the drawing:

Figure 1 is a top plan view of my improved pan showing the broiling surface thereof;

Fig. 2 is a bottom plan view showing the frying surface thereof;

Fig. 3 is a sectional view on line 3—3 of Figure 1, and

Fig. 4 is a sectional view on line 4—4 of Figure 1.

In this illustrative construction, I have shown a combined broiling and frying pan, generally indicated at 1, and having on one face thereof broiling means, generally indicated at 2, and on the opposite face thereof frying means, generally indicated at 3; these several means and the pan structure supporting and enclosing the same being of an improved construction, as hereinafter more fully appears.

Referring first to the broiling means shown in Figures 1, 3 and 4, it will be noted that a raised grid carrying portion 4 of circular form is provided in the center of the pan. On this surface, parallel grid members 5 are disposed, which are in the form of raised ribs on the surface 4 and of different length and disposed in such manner that the several grid members 5 provide a circular grid surface, comprising parallel ribs. Moreover, it will be noted that the portion 4 is divided transversely into halves. Thus, a high line 6 forms a transverse divide from which any liquids will flow down the oppositely sloping troughs between the ribs, either to one end or the other of the longitudinal grid members 5. Moreover, it will be noted that around the portion 4, lower portions 7 are provided which slope away from the central or longest rib 5 and from the high line 6 toward the corners 8 of an upstanding rectangular surrounding rim 9 spaced intermediate these corners substantially equally from the grid carrying portion 4. Thus, all liquid dripping from the material being broiled and resting on the grids 5, will tend to flow between the grids 5 in opposite directions on opposite sides of the line 6. Moreover, when emerging from between the grids, the liquid will further be divided, the liquid from each quarter of the grid surface flowing to a pocket 7a at each corner, the liquid here being divided along a center line extending through the center or longest rib 5. As a result, it is made possible to drain off the liquids quickly and minimize smoking or "burning on" during broiling, while also making it possible to collect all escaping liquids outside the active broiling area carrying the several grids 5.

In my improved construction, the same portion 4 of the pan carrying the grid carrying portion 4 and pockets 7a is also provided with a rim 10 corresponding to the rim 9, but extending oppositely from the latter rim to confine a like area on the opposite side of the pan. This rim 10 thus provides a supporting rim for the broiling pan, heretofore described, while the rim 10 is also adapted to engage any desired supports or positioning means, such, for example, as knobs carried on a suitable support and receivable and fitting in the corners 11 of the rim 10. Herein, I also utilize this rim 10 and the grid supporting portion 4 of the broiling pan to produce a frying surface on the opposite surface of this grid carrying portion. Here attention is directed to the fact that, this portion 4 being raised above the surrounding surfaces 7 leading to the corner pockets, is carried on what may be called a connecting web 12 of rectangular form and which connects this portion 4 to rims 9, 10 and between the top and bottom thereof. However, instead of providing a thick bottom on the circular grid carrying portion 4, i. e., carrying the bottom thereof down to the bottom of this surrounding web 12 and thereby providing a greater depth of metal than necessary, I preferably retain the web of the desired full thickness and just within the web provide a circular recess 13 in the under surface of the bottom of the portion 4, in such manner as thereby to produce a frying surface 14 which corresponds in shape and dimensions to the portion 4. Further, although not limited thereto, I preferably also utilize the raised draining portion of the portion 4 to enable me to provide a dished surface on this frying portion draining toward the axis thereof; the additional metal which would be provided to produce a flat frying surface being unnecessary as a support for the broiling surface and increasing the weight of the utensil, while the elimination of this metal also makes it possible to provide a substantially uniform thickness of metal for the portion 4 throughout while also causing the fat on the frying surface to collect in the center of the latter. Moreover, it will be evident that the depending rim 10 of the broiling pan will thus provide an upstanding rim for the frying pan, while the upstanding rim 9 of the broiling pan will provide a depending rim for the frying pan. Attention is here also directed to the fact that a single laterally extending handle 15 is suitably connected to both of the rims 9 and 10, preferably midway between a pair of adjacent corners and as shown in Figures 1 and 2.

As a result of my improved construction, it will be observed that I have produced an improved utensil having an improved broiling surface on one face thereof whereby improved results as regards smoking or "burning on" are obtained, at the same time that the material being broiled is effectively supported and the escaping juices are quickly and conveniently collected outside the active broiling area comprising the grids on which the material rests. Further, it will be evident that while utilizing portions of the broiler structure including the bottom rim and the bottom of the grid supporting surface thereon, I am able to produce on the opposite face of the broiling pan, a frying pan without requiring any additional material, and when, in fact, lightening and cheapening the construction of the broiler while further providing a substantially uniform thickness of metal beneath the broiler surface. Thus, as a result of my improvement, it is made possible not only to produce a plurality of improved utensils from the same material, but to invert my improved utensil and utilize either cooking face thereof, while utilizing the rim of the other, then depending, as a positioning and locating means for positioning and locating either utensil relative to the same single set of supporting means, such as positioning knobs or the like disposable in the corners of the rim. Attention is also directed to the fact that my improved construction is such as to be readily adapted to use in cast utensils, such, for example, as these formed of aluminum, in such manner as to obtain the known advantages thereof, while even further reducing the weight due to the new combined structure provided which requires a minimum of material. These and other advantages of my improved construction will, however, be clearly apparent to those skilled in the art.

While I have herein specifically described one embodiment which my invention may assume in practice, it will be understood that the same is chosen for purposes of illustration, and that the invention may be modified and embodied in other forms without departing from its spirit or the scope of the appended claims.

What I claim as new and desire to secure by Letters Patent is:

1. In a cooking utensil, a grid supporting portion of substantially uniform thickness throughout having a broiling surface comprising raised grid means on one face of said portion and having a frying surface free from ribs on the opposite face of said portion.

2. In a cooking utensil, a grid supporting portion having a raised face carrying a broiling surface comprising raised grid means on said face and having the opposite face of said portion recessed to produce substantially uniform thickness of said grid supporting portion throughout and provide a frying surface free from ribs.

3. A cooking utensil having broiling and frying surfaces on opposite faces thereof and having said broiling surface raised and draining juices toward the periphery thereof and said frying surface depressed and draining toward its center.

4. A cooking utensil having a grid supporting portion, parallel ribs raised thereon, and a frying surface free from ribs and formed on the opposite face of said grid supporting surface, said ribs forming a substantially circular grid and said frying surface being of substantially the same diameter and recessed into said opposite face of said grid supporting portion.

5. In a cooking utensil, a grid supporting portion having raised grid means thereon and having a frying surface free from ribs on the opposite face of said grid supporting portion, said grid supporting portion being raised at its center and said frying surface being recessed into said portion, and a laterally extending handle on said portion.

6. In a cooking utensil, a grid supporting portion and parallel ribs thereon including longer central and shorter side ribs and forming a substantially circular grid, a rectangular supporting portion surrounding the same and having corner pockets, and upstanding and depending rims connected to said supporting portion intermediate the top and bottom of said rims.

7. A broiling utensil having a grid surface comprising parallel ribs, grooves between said ribs sloping downward from a transverse median line toward opposite ends of said ribs, and means for segregating the discharge from opposite sides of a longitudinal center line of said grid surface at each end of said ribs.

8. In a cooking utensil, a grid supporting portion and parallel ribs thereon including longer central and shorter side ribs and forming a substantially circular grid, means for directing half of the juices dropping on to said grid, toward each end of said ribs, and means for collecting the flowing juices opposite the free ends of each quarter of said ribs.

9. A cooking utensil comprising a recessed frying surface of circular form, a rectangular supporting portion surrounding the same, and upstanding and depending enclosing and positioning rims connected to said supporting portion intermediate the top and bottom of said rims.

10. A broiling utensil including a circular grid portion having an upper ribbed surface, a supporting portion providing juice collecting corner areas opposite different quadrants of said grid portion and disposed below the latter, and a rim upstanding from the periphery of said supporting portion.

11. A broiling utensil including a circular grid portion having an upper ribbed surface, a rectangular supporting portion about said ribbed surface and disposed below the latter having sloping portions providing juice collecting corner areas remote from said grid portion, and a rim extending around the periphery of said rectangular portion.

FRANK E. WOLCOTT.